(12) United States Patent
Hlava et al.

(10) Patent No.: US 6,274,847 B1
(45) Date of Patent: Aug. 14, 2001

(54) MULTI-PURPOSE COOKING APPARATUS

(75) Inventors: Lorens G. Hlava; Mary Barrow, both of Clinton, MO (US)

(73) Assignee: The Holmes Group, Inc., Milford, MA (US)

( * ) Notice: Subject to any disclaimer, the term of this patent is extended or adjusted under 35 U.S.C. 154(b) by 0 days.

(21) Appl. No.: 09/566,347

(22) Filed: May 8, 2000

(51) Int. Cl.$^7$ ................ A47J 36/26; H01H 3/16
(52) U.S. Cl. .............. 219/433; 219/432; 219/435; 219/518; 99/340
(58) Field of Search ................ 219/432, 433, 219/429, 435, 441, 518; 99/340

(56) References Cited

U.S. PATENT DOCUMENTS

| | | | | |
|---|---|---|---|---|
| 3,134,007 | * | 5/1964 | Niblo ................ | 219/518 |
| 4,164,644 | * | 8/1979 | Remsnyder et al. ........ | 219/433 |
| 4,307,287 | * | 12/1981 | Weiss ................ | 219/432 |
| 5,809,870 | * | 9/1998 | Baillieul ............... | 219/441 |

FOREIGN PATENT DOCUMENTS

| | | | |
|---|---|---|---|
| 133906 | * | 3/1985 | (DE) . |
| 3430878 | * | 3/1986 | (DE) . |
| 2651666 | * | 3/1991 | (FR) . |
| 2222025 | * | 2/1990 | (GB) . |
| 9605761 | * | 2/1996 | (WO) . |

* cited by examiner

Primary Examiner—Joseph Pelham
(74) Attorney, Agent, or Firm—Hoffmann & Baron, LLP; Francis E. Marino

(57) ABSTRACT

A cooking apparatus including a housing having an interior which contains a heating device. A sensor is provided that is operatively connected to the heating device. The sensor having an actuated position, wherein the sensor affects a heat output generated by the heating device. A first and second cooking insert for containing the food to be cooked each being separately positionable within the housing interior. The first cooking insert actuating the sensor when positioned in the housing interior, and the second cooking insert not actuating the sensor when positioned in the housing interior.

27 Claims, 10 Drawing Sheets

MULTI-PURPOSE COOKING APPARATUS

FIELD OF INVENTION

The present invention relates to a cooking apparatus and specifically to a multi-purpose cooking apparatus which is capable of performing various types of cooking operations, including slow cooking and roasting.

BACKGROUND OF THE INVENTION

Roasters and slow cookers are two types of cooking devices well known in the art. Roasters typically include a covered chamber lined by a metal pan for receiving the food to be cooked. The temperature controls permit a wide range of cooking temperatures that may be set to accommodate a particular recipe. Roasters typically permit temperatures as high as 500° F. which is similar to that found in a typical kitchen oven. Roasters operate similar to a standard electric oven wherein the food is placed therein and cooked for a relatively short period of time, i.e., half an hour to two or three hours. Roasters include one or more heating elements that are capable of producing the high temperature required for roasting. Roasters typically include metal pan which hold the food. The metal pan fairly quickly and evenly distributes the heat thereby preventing the formation of localized hot spots.

Another type of cooking device well known in the art is a slow cooker. An example of such a device is marketed by the Assignee of this application under the trademark Crockpot®. Slow cookers typically include a stoneware or ceramic vessel for holding the food. The stoneware is typically removably insertable in a housing that contains heating elements for supplying heat to the stoneware and food. Slow cookers typically have a selector switch having a "high", "low" and "off" setting for varying the heat setting thereby affecting the cooking time.

The maximum power generated by slow cookers is significantly less then that for roasters since slow cookers rely on a slow even rate of cooking. Cooking time in slow cookers range from four to several hours. The low temperature cooking permits users of the device to start a meal cooking in the morning and have it ready and properly cooked in time for dinner. Due to the slow cooking nature of the device, the contents of the stoneware need not be constantly monitored in order to prevent burning such as with a roaster. In addition, the relatively low power and even distribution of heat of the slow cooker prevents any particular hot spot on the stoneware, which could lead to thermal stresses and cracking. The stoneware acts as an insulator which is beneficial for slow cooking but is susceptible to cracking if the heat output is too high and the temperature rises too quickly.

Roasters and slow cookers provide two very different ways to prepare food. The roaster with its high temperature range permits cooking meals within a relatively short time while the slow cooker allows simmering type cooking over several hours. Accordingly, it is desirable to have both a roaster and slow cooker in order to accommodate a wide variety of cooking situations. However, both of these units are relatively large counter top appliances and therefore either take up a large amount of kitchen counter top space or storage space in the kitchen. This particular problem is especially acute in small kitchens where the counter top space and storage is at a premium.

However, roasters of the prior art are unsuitable for safely slow cooking food in stoneware due to the high power output of such devices and the temperature sensitivity of stoneware. The control circuit of roasters typically includes a thermostat which turns on a heating element until a desired temperature level is reached and then the element is shut off. The cycling on and off of the heating element is used to control the temperature. Therefore, even on relatively low temperature settings a cooking vessel is subjected to a full power high heat condition that could damage stoneware. Accordingly, roasters almost exclusively include metallic inserts that are able to quickly distribute the heat and permit uniform cooking of the contents. In contrast, stoneware, which is essentially an insulator, does not dissipate heat well and is subject to cracking when exposed to fast temperature rises and high heat levels.

Accordingly, it would be desirable to provide a multipurpose cooking apparatus that selectively provides the cooking characteristics of both a roaster and a slow cooker.

SUMMARY OF THE INVENTION

It is an advantage of the present invention to provide a cooking apparatus which is capable of functioning as a roaster and a slow cooker.

It is a further advantage that the present invention to provide a cooking apparatus having a heating device which can be selectively controlled to deliver the appropriate heat depending on the cooking function which is desired.

It is yet a further advantage of the present invention to provide a cooking apparatus having a switch that is actuatable by a food holding component of the cooking device such that when it is inserted therein, the proper heating profile is developed.

These and other advantages of the present invention may be obtained by providing a cooking apparatus including a housing having an interior which contains a heating device. A sensor is provided that is operatively connected to the heating device. The sensor having an actuated position, wherein the sensor affects a heat output generated by the heating device. A first and second cooking insert for containing the food to be cooked are each separately positionable within the housing interior. The first cooking insert actuating the sensor when positioned in the housing interior, and the second cooking insert not actuating the sensor when positioned in said interior.

The present invention may also provide a cooking apparatus including a housing having a base and a wall extending upwardly therefrom forming a housing interior. A heating device is positioned in the housing interior. A first and second cooking insert for holding food to be cooked is provided and each of the first and second cooking inserts is separately positionable within the housing interior. A sensor is operatively connected to the heating device. The sensor is able to detect the presence of one of the first and second inserts when positioned within the housing. The sensor affects the heat output of the heating device upon the detection of the one of the first and second inserts.

As more specifically described by way of the preferred embodiment herein, the inserts made of differing configurations with one of the first and second inserts actuating the sensor and the other insert not actuating the sensor. To achieve this, the housing side wall ends in an upper rim and the first insert has an outwardly extending first flange supported by the upper rim when the first insert is positioned within the housing interior. The first insert has a first body portion extending below the first flange that actuates the sensor when the first flange rests upon the rim. The second insert has a second flange extending outwardly therefrom. The second flange is supported by the housing upper rim when the second insert is positioned within the housing interior. The second insert does not actuate the sensor when positioned within the insert. The sensor includes a switch that is actuatable by one of the first and second inserts. The heating device includes a plurality of heating elements and the switch is operatively connected to one of the plurality of heating elements for interrupting power transmission thereto.

In addition, the first insert may include a stoneware pot and the second insert may include a metallic pan. The sensor detects the presence of the first insert within the housing and limits the maximum power output of the heating device such that the cooking apparatus functions as a slow cooker.

DETAILED DESCRIPTION OF THE PREFERRED EMBODIMENT

The present invention provides a multi-functional cooking apparatus that is capable of safely and efficiently operating as both a roaster and a slow cooker. The invention is preferably directed to a counter top cooking apparatus having the ability to combine the functions of a roaster and a slow cooker, thereby eliminating the need for two separate appliances saving valuable kitchen counter top and storage space.

Figure 1A:
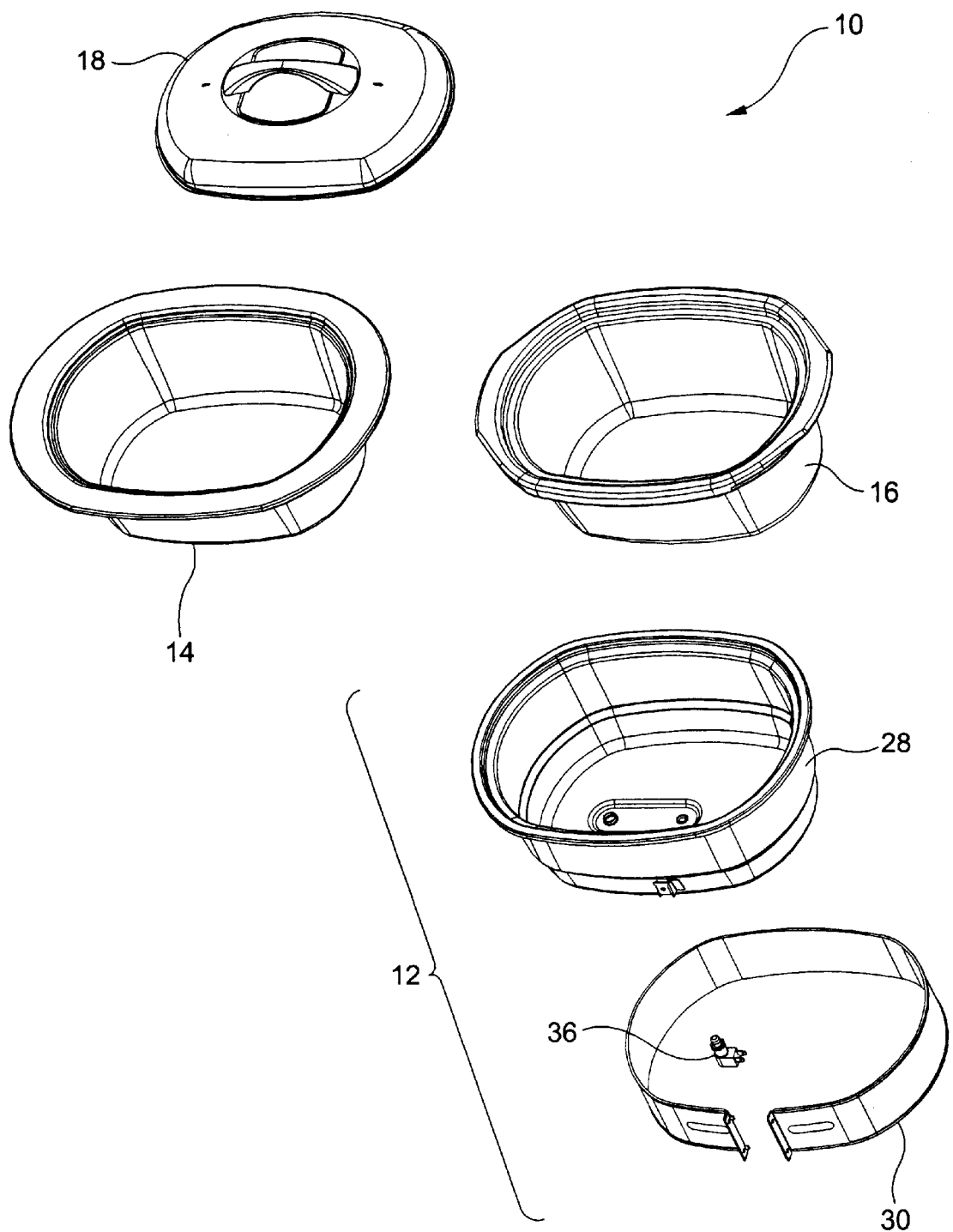
FIGS. 1A and 1B are an exploded perspective view of the multipurpose cooking apparatus of the present invention showing both a metallic and stoneware cooking insert.
Figure 1B:
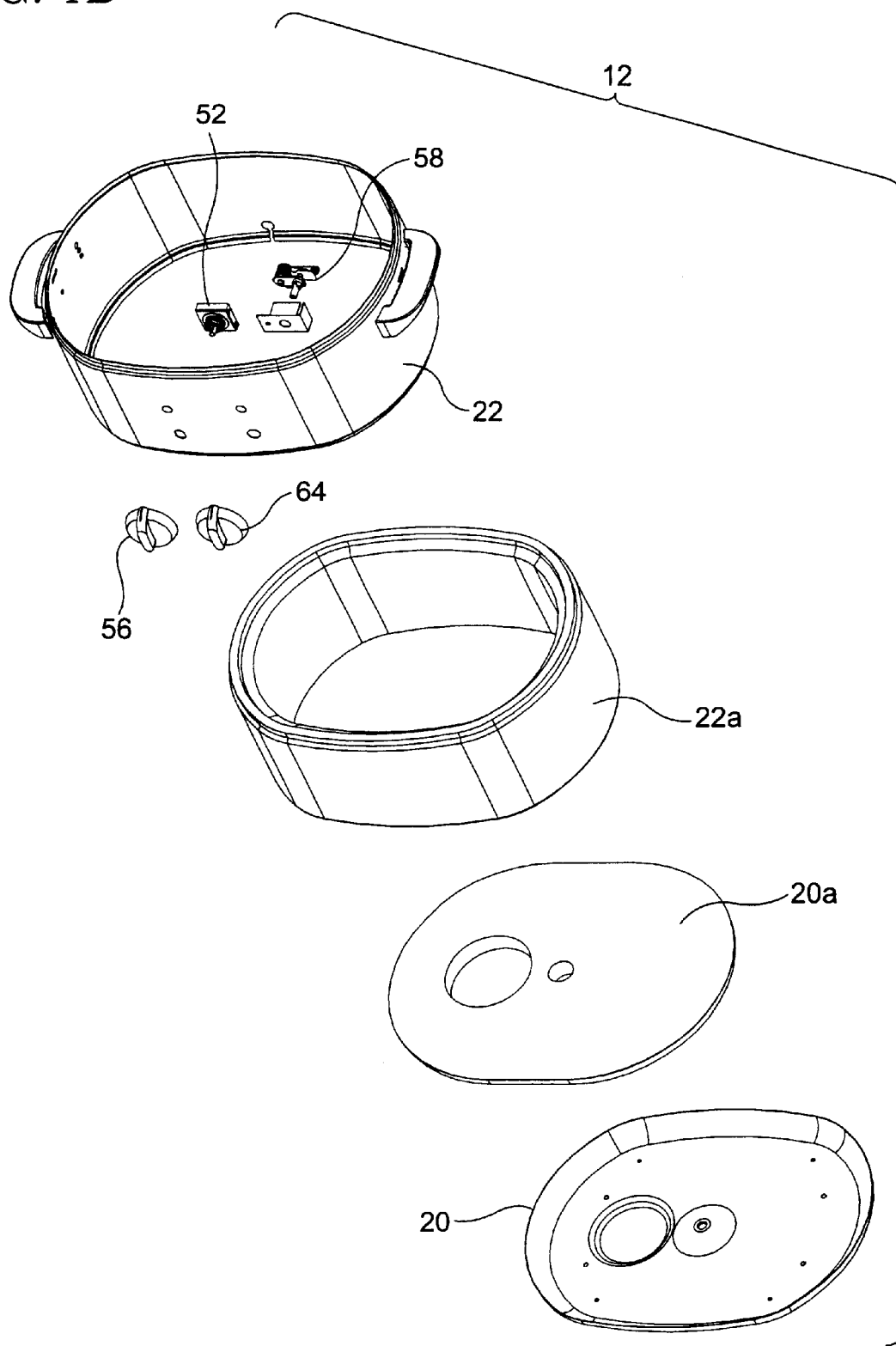
Figure 2:
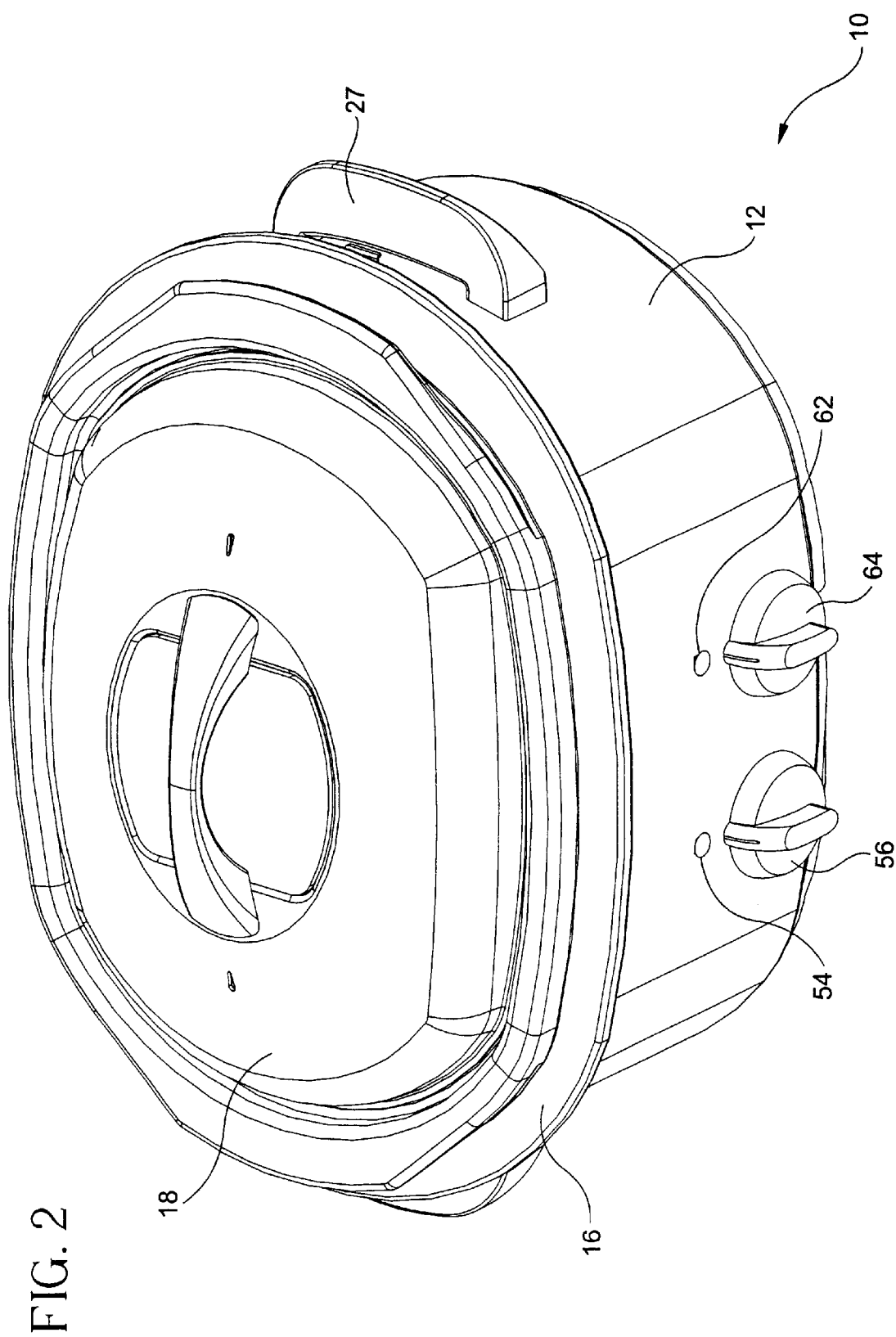
FIG. 2 is a top perspective view of the cooking apparatus of the present invention.

The preferred embodiment of the present invention is shown in FIGS. 1A–B and 2. Generally, the cooking apparatus 10 includes a housing assembly 12, a metallic cooking insert 14 and a stoneware or ceramic cooking insert 16 that are used to hold the food. Stoneware insert 16 is essentially a pot used for slow cooking and is preferably formed of ceramic material of the type used to form standard slow cooker inserts. Metallic insert 14 is essentially a pan used for roasting. Cooking inserts 14 and 16 are selectively removably insertable within housing assembly 12 depending on if the roaster or slow cooker function is desired. Metallic insert 14 may include a removable roasting rack 17 for supporting the food. In addition, a lid 18 is further provided to cover the contents of the cooking insert.

Figure 3:
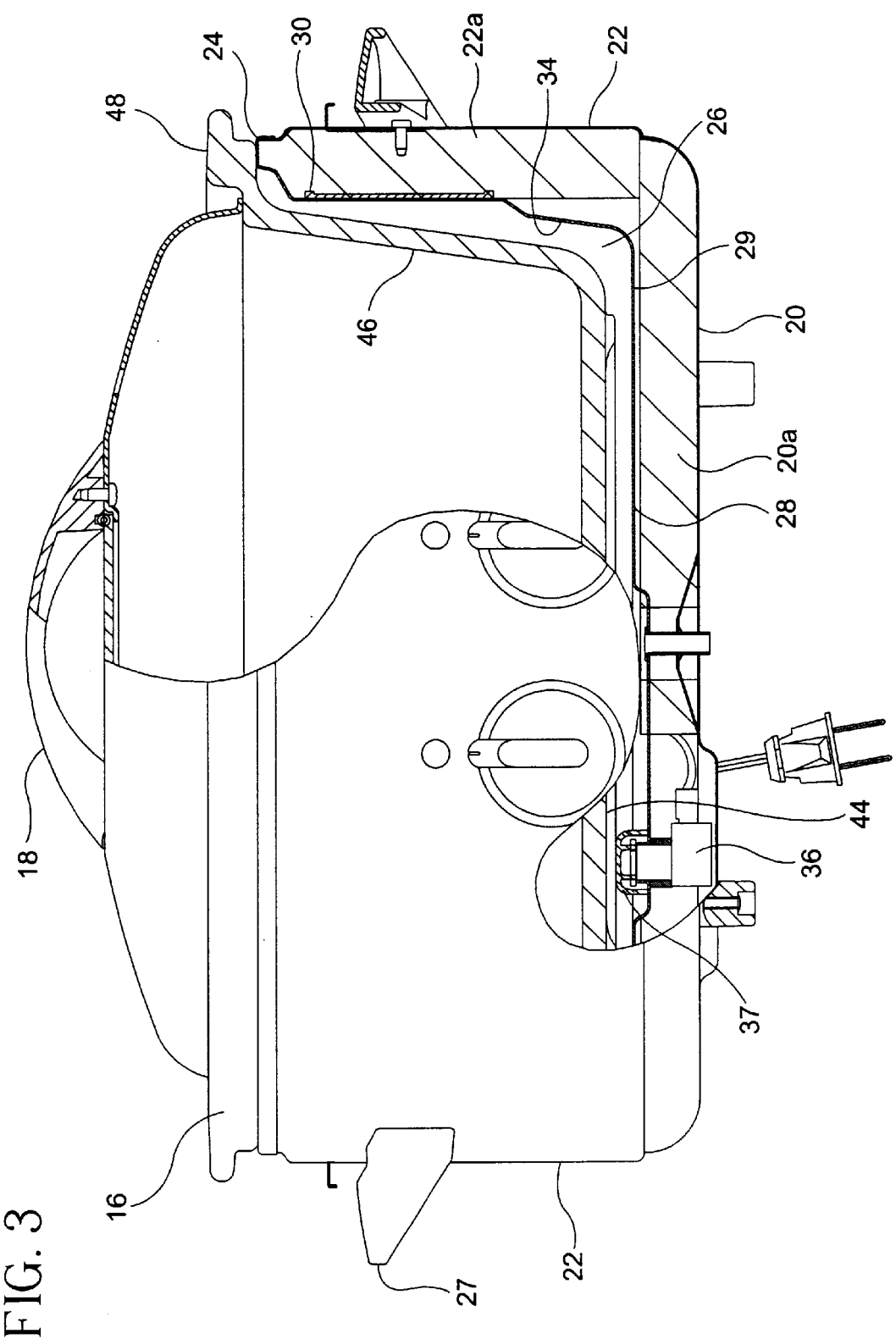
FIG. 3 is a front elevational view of the present invention having the stoneware insert placed therein with portion of the cooking apparatus cut away for clarity.
Figure 5:
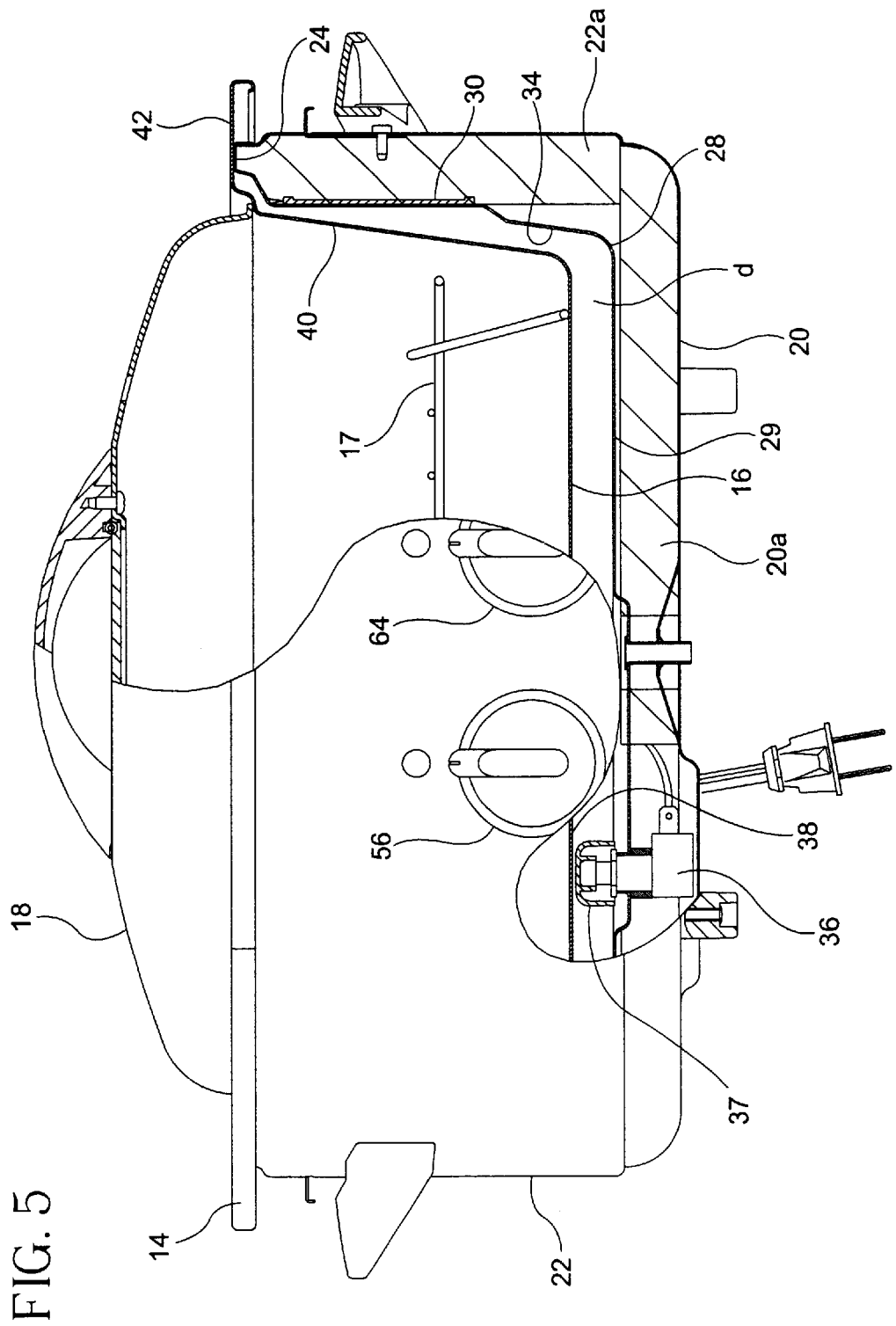
FIG. 5 is a front elevational view of the present invention having the metallic cooking insert placed therein with a portion of the housing cut away for clarity.

Referring additionally to FIGS. 3 and 5, housing assembly 12 preferably includes a base 20 which is parametrically bounded by an upwardly extending side wall 22 ending in a rim 24. Base 20 and side wall 22 define a housing interior 26. Side wall 22 may include a pair of outwardly extending handles 27 in order to submit an individual to carry the cooking apparatus 10. Housing interior preferably includes an inner surface defined by a liner 28 that is preferably formed of a heat conductive material such as aluminum or steel. Liner 28 extends along the inner surface of side wall 22 and base 20 and is configured to receive the metallic or stoneware inserts 14 and 16.

In order to heat the food contents of the cooking insert, a heating device 30 is positioned about an outer surface of liner 28. Heating device 30 preferably includes a plurality of resistance type heating elements formed in a band wrapping around liner side wall 34. Heating elements when supplied with power transfer heat to liner 28 side wall, which through conduction carries the heat throughout the liner. The heated liner distributes the heat about the cooking insert that is positioned within the housing. In order to protect housing side wall 22 and base 20 from the heat, side wall insulation 22a and bottom insulation 20a may be inserted in the housing. Insulation 22a and 20a may be of a fiberglass material of the type typically used in roasters.

When a cooking insert is positioned within the housing, the side wall of the insert is spaced relatively close to heating device 30. If the heat output is not properly regulated, problems may occur when stoneware insert 16 is placed in housing interior 26. The stoneware insert is particularly susceptible to fast and high concentrations of heat since it does not quickly dissipate heat. This permits localized hot spots on the stoneware that could result in localized thermal stresses and cracking. The metallic insert due to its ability to quickly conduct heat away reduces any thermal stresses caused by localized heating and therefore is suitable for fast, high heat environments.

In order to ensure that the appropriate heat output is developed for the different inserts, the present invention includes an insert discriminating sensor. Accordingly, the cooking apparatus of the present invention can determine which insert, stoneware 16 or metallic 14, is placed within housing 12 and adjust the maximum permitable heat output accordingly. The sensor is activated by placement of one of the inserts into the housing such that the proper heat output range for the desired cooking method can be employed. The proper heat level is maintained for a slow cooker that relies on low even heat for slowly cooking its contents over several hours. Therefore, when stoneware insert 16 is placed within housing 12, the maximum heat output permitted by heating device 30 is limited to prevent thermal shock and cracking of the stoneware. However, when metallic insert 14 is inserted in housing 12, and thereby designating the roaster function, the maximum heat output is permitted to be increased in order to achieve suitable roasting temperatures.

Figure 6:
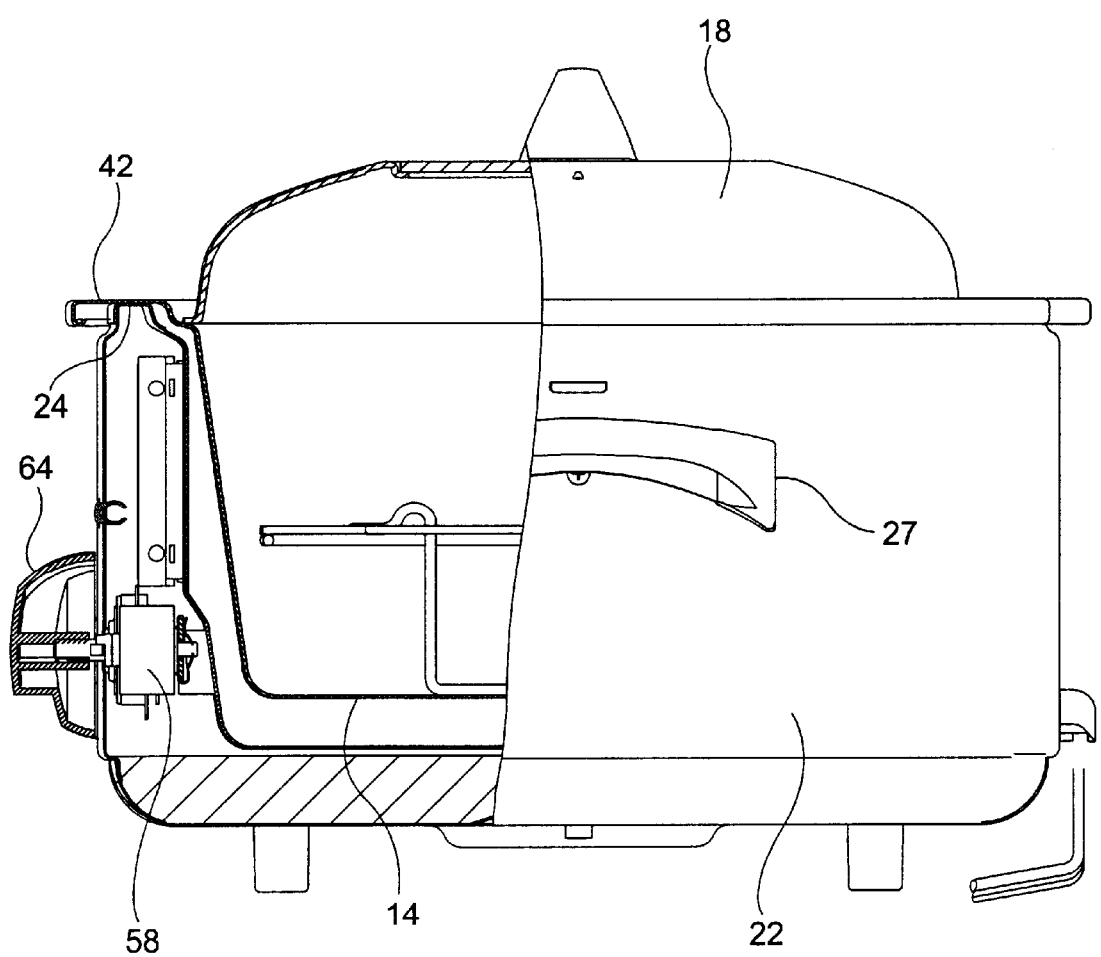
FIG. 6 is a side elevational view with a portion of the housing cut away for clarity of the cooking apparatus of FIG. 5.

In the preferred embodiment, sensor 36 detects the particular configuration of inserts 14 and 16. That is, the stoneware insert 16 and the metallic insert 14 may be differently configured resulting in sensor 36 being actuated by one insert and not the other. Referring to FIGS. 5 and 6, metallic insert 14 is a pot-like structure having a bottom wall 38 surrounded by a side wall 40 with an annular flange 42 extending radially outward from an upper end of side wall 40. Flange 42 is dimensioned to rest upon rim 24 of the housing side wall when insert 14 is placed within housing 12. The distance between flange 42 and an insert bottom wall 38 is such that metallic insert bottom wall 38 is spaced a certain distance d from the bottom wall 29 of liner 28.

Figure 4:
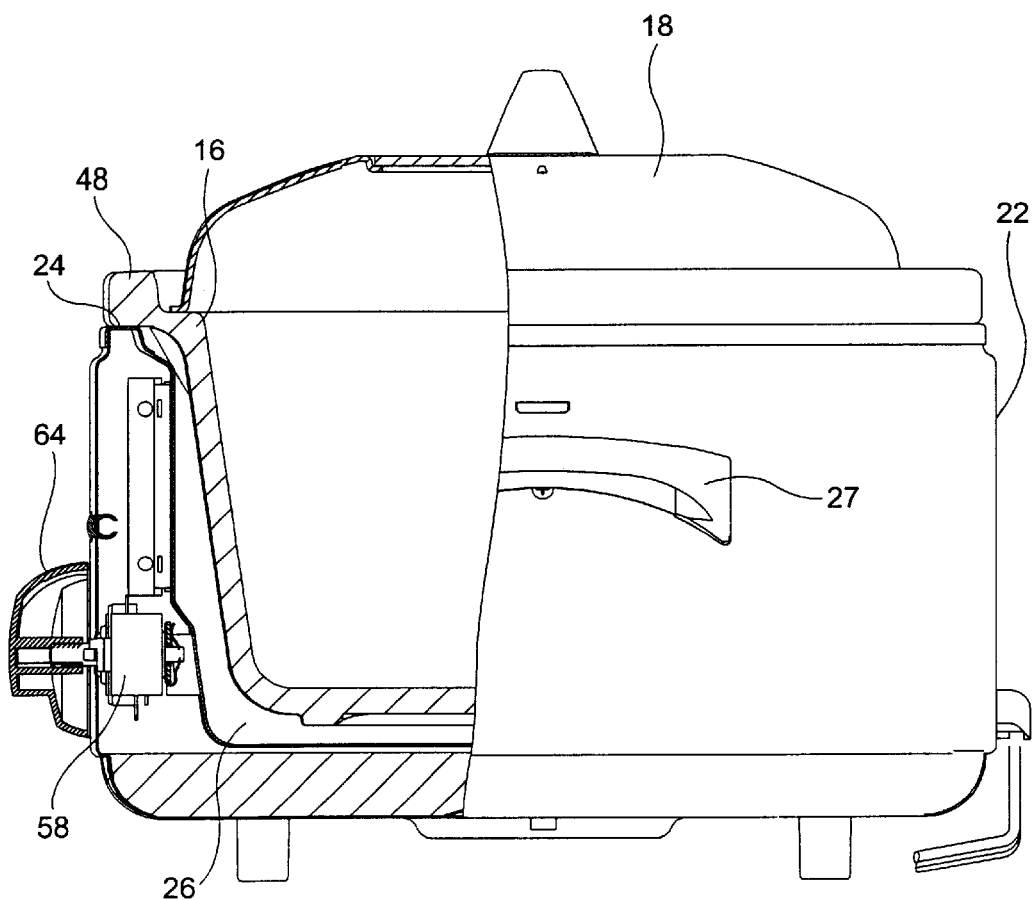
FIG. 4 is a side elevational view showing a partial cut away of the cooking apparatus of FIG. 3.

Referring to FIGS. 3 and 4, stoneware cooking insert 16 is similarly configured to metallic insert 14 having a bottom wall 44 surrounded by an upwardly extending side wall 46 which ends in the outwardly extending annular flange 48. When insert 16 is placed within housing 12, flange 48 is supported by housing rim 24 and side wall 46 and bottom wall 44 extend into housing interior 26. Stoneware insert 16, however, preferably extends further into the housing interior 26 than metallic insert 14.

In order to distinguish between the two cooking inserts 14 and 16, sensor 36 preferably includes a cut off switch that is positioned on liner bottom wall 29 and extends upwardly there through into housing interior 26. Sensor 36 is actuated by stoneware insert 16 as shown in FIG. 3, but not engaged by metallic insert shown in FIG. 5 due to insert 16 extending further into housing interior 26 than insert 14. Sensor 36 may be a plunger type single pole single throw switch that is biased in the unactuated position. One particular switch that has been found to be suitable is marketed by Cutler Hammer, Inc. of Milwaukee Wis. as Type 7835 K11A. Sensor 36 may be covered by a resilient heat resistant cap 37 that protects the components of sensor 36 from contamination and the heat of the cooking insert. Sensor 36 works in conjunction with a control circuit 50 (FIG. 7) to regulate the heat output of heating device 30.

It is also within the contemplation of the present invention that other types of sensors could be employed in order to distinguish between different cooking inserts. For example, a sensor that would be activated by a metal and not stoneware, such as a Hall-effect type sensor, could be used to detect the metallic insert 14. Therefore, an unactuated sensor would indicate a stoneware insert, and an actuated sensor would indicate a metallic insert was present in the housing. With such a material detecting sensor, the configuration of the two cooking inserts 14 and 16 could be substantially the same.

In addition, it is further within the contemplation of the present invention that the configuration of cooking inserts 14 and 16 could be altered in a number of ways in order to have only one of the inserts activate the sensor. For example, switch 36 could be mounted on housing rim 42 and one of the inserts may include a notch (not shown) in its flange. Therefore, the insert with the notch would not activate switch 36 and the insert without a notch would actuate the sensor.

Figure 7:
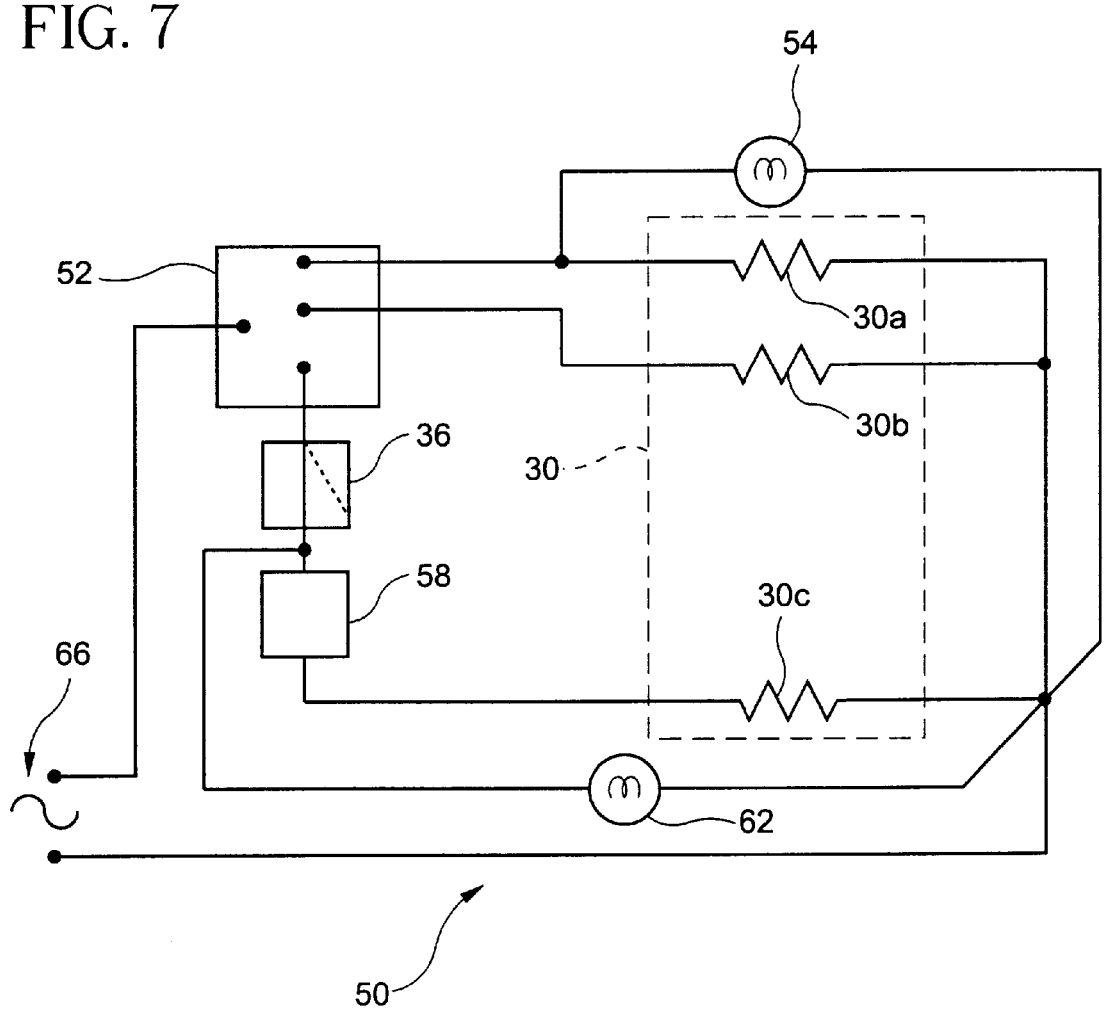
FIG. 7 is a schematic view of the control circuit of the present invention.

With regard to the preferred embodiment, in order to illustrate the effects of sensor 36 being moved into the actuated position, control circuit 50 will now be described. Referring to FIG. 7, heating device 30 includes a plurality of heating elements each of varying wattage. In the preferred embodiment there are three such heating elements 30a, 30b and 30c having wattage values of 225 W, 50 W and 775 W, respectively. It is understood that these numbers are to be illustrative and not limiting as the actual number of elements and wattage values could be varied in order to obtain the desired heating profile. Heating elements 30a, and 30b are used in the slow cooking function, and the high-wattage heating element 30c is used only in the roaster function.

Sensor 36 may be placed in control circuit 50 such that when sensor 36 is actuated by stoneware insert 16, the circuit to at least one of the three heating elements is electrically opened thereby preventing that element from being energized. Preferably, sensor 36 may open the circuit to the 775 W heating element 30c. Therefore, when the stoneware insert 16 is placed within the housing 12, only the 225 W and 50 W heating elements are capable of being energized. When sensor 36 is not actuated, such as when metallic insert 14 is placed within housing interior 26, heating element 30c may be energized.

In an alternative embodiment (not shown), metallic insert 14 may be configured to activate a sensor and stoneware insert 16 may be configured not to actuate such a sensor when placed inside housing 12. In this embodiment the high-wattage heating element would only be energizable when the sensor is actuated by the metallic insert placed within the housing.

The control circuit 50 further preferably includes a first controller in the form a user actuatable selector switch 52. A rotary-type switch of the type manufactured by Tower Manufacturing Corp. of Providence, R.I. under the label 3000 Series has been found to provide suitable results. Selector switch 52 may include four discrete positions off, low, high and roast. A first pilot light 54 may be provided to indicate that selector switch is the high or low positions. The high and low settings are selected when the slow cooker function is desired, and the roast position is selected when the roaster function is desired. Selector switch 52 is placed with the control circuit such that it receives current directly from a power source and supplies current to heating elements 30a, 30b and 30c in the low, high and roast settings, respectively. Selector switch 52 is preferably located on housing side wall 22. A first dial 56 positioned on the outside of side wall 22 may be provided to permit a user to easily actuate selector switch 52.

A second controller in the form of a thermostatic switch, or thermostat 58 is also preferably included. A thermostat marketed by Sammax International Ltd. of Providence, R.I. as type AP-151 has been found to be suitable for this application. Thermostat 58 is of a type known in the art for temperature control and includes a temperature sensitive bimetallic component. In the preferred embodiment, sensor 36 is placed in the control circuit between selector switch 52 and thermostat 58. Thermostat 58 is also operatively connected to heating element 30c. Therefore, when sensor 36 is actuated thermostat 58 and heating element 30c are decoupled from power source 66. In addition, when thermostat 58 electrically opens, such as when a set temperature is reached, current to heating element 30c will be terminated. Thermostat 58 further includes a second dial 64 that permits the user to set a certain temperature for roasting. When the temperature of the cooking apparatus reaches the preset level, the bi-metallic component will open the circuit thereby cutting power the 750 W element 30c. A second pilot light 62 may be provided to indicate when the circuit is closed and current is flowing through thermostat 58. Thermostat 58 is preferably located on housing side wall 22 and is actuated by second dial 64 positioned on the outside of side wall 22 to be accessible by a user.

It is also of the contemplation of the present invention to combine the selector switch and thermostat switch into one control device. In such a device, the control would start in an off position and would be moveable to a low setting and then high and then further rotatable to a particular roasting temperature.

With reference to FIG. 7, the operation of the preferred control circuit 50 will now be described. The input of selector switch 52 is electrically coupled to an ac power source 66, and the output is electrically coupled to heating elements 30a, 30b, and 30c. Heating element 30c is a high wattage element used only for the roasting function. If the slow cooker function is desired, stoneware insert 16 may be placed within housing 12 thereby actuating sensor 36. Upon actuation, sensor 36 electrically decouples thermostat 58 and high wattage heating element, 30c, from power source 66. Therefore, heating element 30c cannot be energized with the stoneware insert in place. Selector switch 52 may then be set to either the off, low or high power setting. In the low position, power to the 225 W heating element, 30*a*, is supplied. When the switch 52 is moved to the high setting both the 225 W and 50 W heating elements, 30*a* and 30*b*, are powered. The high and low power settings are suitable for use with stoneware insert 16 and provide the heating requirements for slow cooking function.

When the roaster function is desired, a user would rotate selector switch 52 to the "roast" setting thereby electrically coupling selector switch 52 to sensor 36 and thermostat 58. Metallic insert 14 may then be placed within housing interior 26. Due to the configuration of insert 14, sensor 36 remains in its unactuated position when metallic insert 14 rests within housing 12. In the unactuated position, sensor 36 which is normally closed completes the circuit from the power source to the 775 W element, 30*c*. This arrangement permits power to be supplied to heating element 30*c* thereby providing the maximum heat output of heating device 30. The user may then set thermostat 58 to the desired cooking temperature. When the set temperature is reached, thermostat 58 will open terminating power to heating element 30*c*. When the temperature drops beyond a certain level, the temperature will close providing power again to element 30*c*. This cycling on and off maintains the desired cooking temperature of the cooking apparatus 10 in a manner well known in the art.

Figure 8:
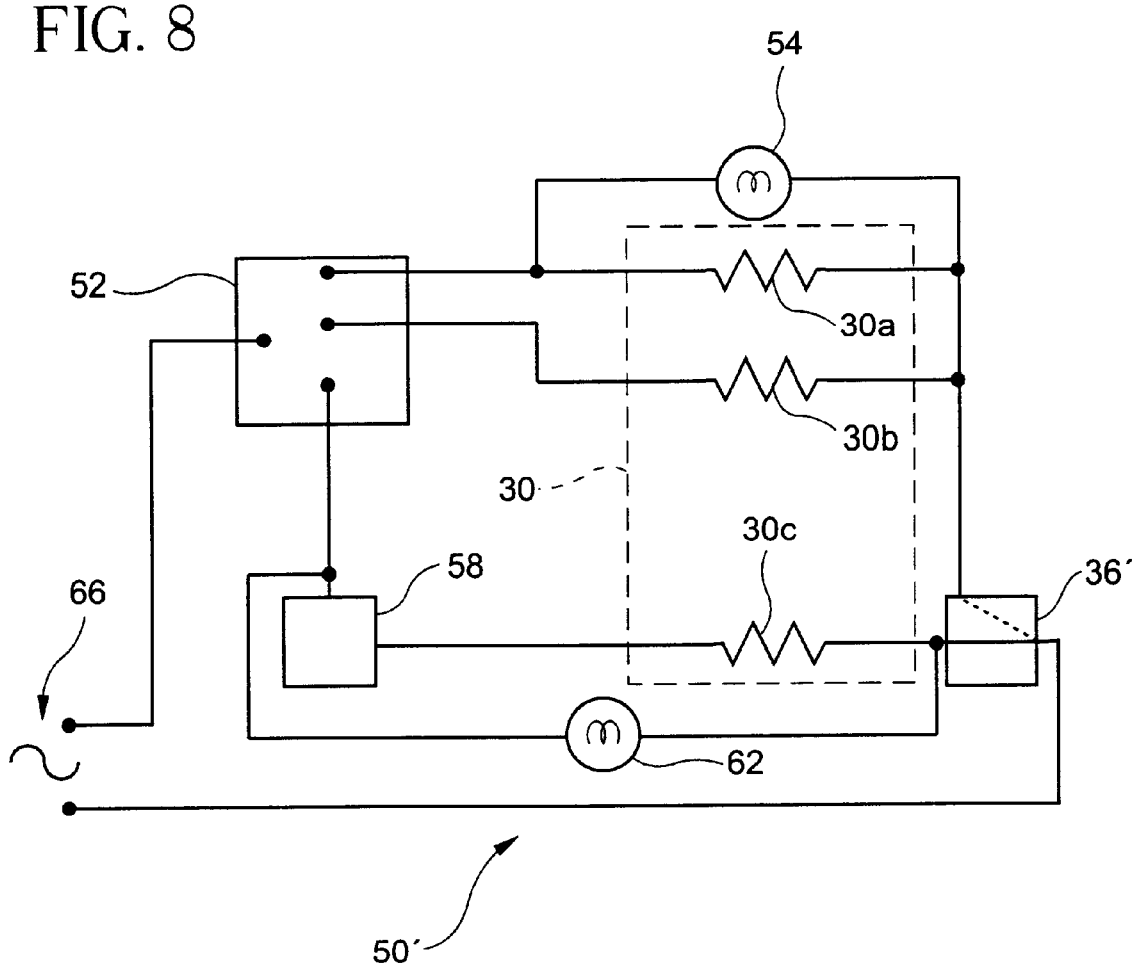
FIG. 8 is a schematic view of an alternative embodiment of the control circuit of the present invention.

An alternative control circuit 50' is shown in FIG. 8. Control circuit 50' differs from that of the preferred embodiment primarily in the position within the circuit of insert detecting sensor. In this embodiment, sensor 36' is preferably a single throw double pole switch electrically coupled between heating elements 30*a*, 30*b*, and 30*c* and power source 66.

Due to the configuration of insert 14, sensor 36' remains in its unactuated position when metallic insert 14 rests within housing 12. In the unactuated position, sensor 36' completes the circuit from the power source to the 775 W element, 30*c*, and simultaneously opens a circuit disabling heating elements 30*a* and 30*b*. In an unactuated or first position, only element 30*c* is electrically connected to power source 66 and capable of being energized. In this state the roasting function can be performed. When sensor 36' is actuated such as by stoneware insert 16, element 30*c* is decoupled from power source 66 and elements 30*a* and 30*b* are coupled thereto. In this state the slow cooker function can be performed.

Figure 9:
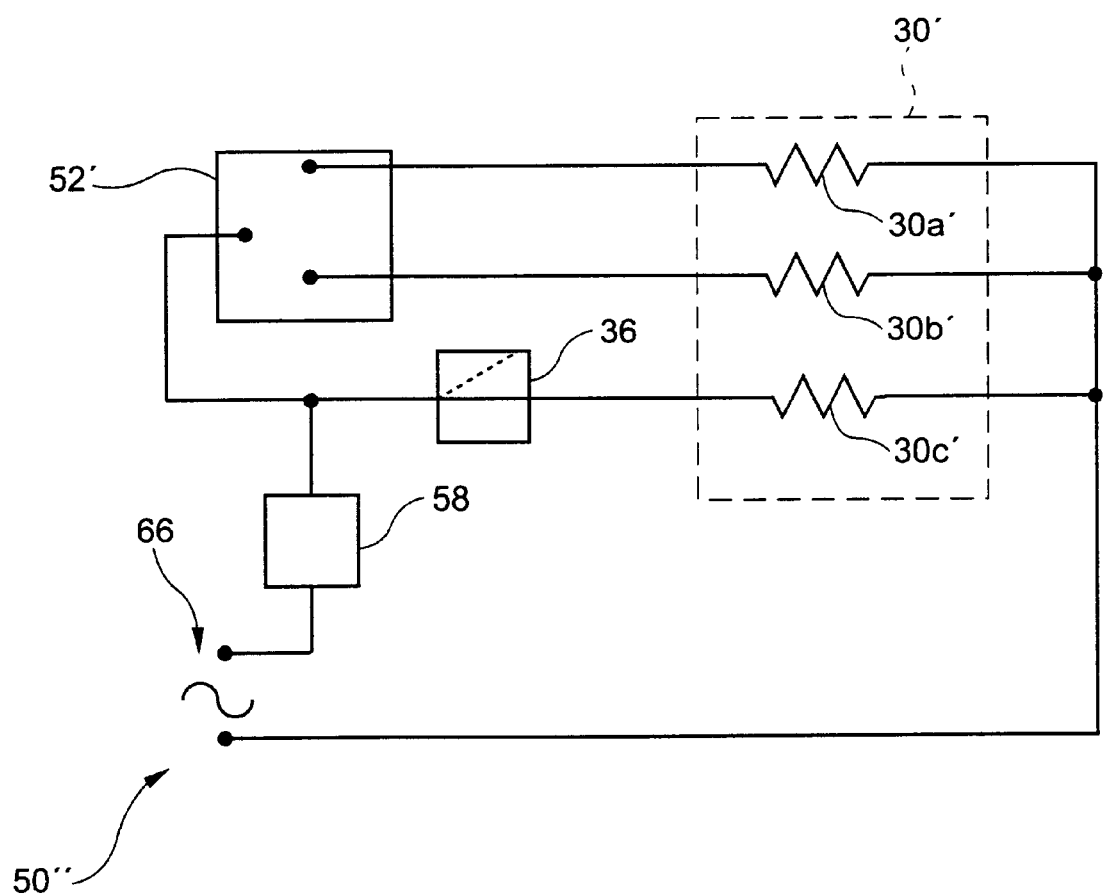
FIG. 9 is a schematic view of another alternative embodiment of the control circuit of the present invention.

Referring to FIG. 9, another alternative control circuit 50" may be employed. In this embodiment, heating device 30' includes three heating coils 30*a*', 30*b*' and 30*c*' having a wattage of 225 W, 50 W and 500 W, respectively. A selector switch 52' having an off, high and low setting is also provided. Selector switch 52' is placed with control circuit 50" such that it receives current passing through thermostat 58 and selectively supplies current to heating elements 30*a*' and 30*b*'. Insert detecting sensor 36 includes a normally closed single pole single throw switch that selectively controls a circuit path to heating element 30*c*'. The user adjustable thermostat 58, of a type described with reference to the preferred embodiment, is placed in the circuit between power source 66 and heating elements such that when it electrically opens, current to heating elements 30*a*' and 30*b*', and 30*c*', will be terminated.

When power is supplied to control circuit 50" of cooking apparatus 10, current may flow through normally closed thermostat 58 to the input of selector switch 52'. When stoneware insert 16 is present in housing 12 thereby actuating sensor 36, a circuit to the 500 W heating element is electrically opened preventing this high wattage heating element form being energized. Selector switch 52' may then be set to either the off, low or high power setting. In the low position, power to the 225 W heating element is supplied. When selector switch 52' is moved to the high setting both the 225 W and 50 W heating elements are powered. These power settings are suitable for use with stoneware insert 16 and provide the heating requirements for slow cooking function. In addition, the minimum temperature of thermostat 58, i.e., the minimum temperature at which the bi-metallic thermostat element will open, is not attained even when both the 225 W and 50 W heating elements 30*a*', and 30*b*' are powered. Therefore, the circuit from the power source to selector switch 52' is always uninterrupted when cooking apparatus 10 is used as a slow cooker.

When the roaster function is desired, metal insert 14 may be placed within housing interior 26. Due to the configuration of insert 14, sensor 36 remains in its unactuated, normally closed position when insert 14 sits within housing 12. Therefore, a circuit from the power source to the 500 W element 30*c*' is established. A user would rotate selector switch 52' to the high setting and set thermostat 58 to the desired cooking temperature. Therefore, power will be supplied to all three heating elements providing the maximum heat output of heating device 30'. When the set temperature is reached, thermostat 58 will open terminating power to all heating elements 30*a*', 30*b*' and 30*c*'. When the temperature drops beyond a certain level, the temperature will close providing again to all the elements. This cycling on and off maintains the desired cooking temperature of the cooking apparatus 10.

As will be appreciated by those skilled in the art, a wide variety of circuit and circuit components could be employed in order to ensure the benefits of the preferred embodiment, i.e., limiting the heat generated when the stoneware liner 16 is inserted in the housing and permitting full power when the metallic insert or roaster function is desired.

Accordingly, the present invention provides the advantages of two distinct cooking apparatuses in one multifunctional unit. A user may have the benefits of both a slow cooker and a roaster without having to purchase and store two separate units. The present invention also ensures that the appropriate heat output for each cooking function is provided.

Thus, while there has been described what are presently believed to be the preferred embodiments of the present invention, other and further modification and changes can be made thereto without departing from the true spirit of the invention. It is intended to include all further and other modification and changes that would come within the true scope of the invention as set forth in the claims.

What is claimed is:

1. A cooking apparatus comprising:

a housing having a base and a wall extending upwardly therefrom forming an interior;

a heating device positioned in said interior;

a sensor operatively connected to said heating device, said sensor upon actuation thereof affecting a heat output generated by said heating device;

a first and second cooking insert each separately positionable within said housing interior; and said first cooking insert actuating said sensor when positioned in said housing interior, and said second cooking insert not actuating said sensor when positioned in said housing interior.

2. The cooking apparatus as defined in claim 1, wherein said first cooking insert is configured to actuate said sensor when positioned in said housing interior, and said second cooking insert is configured to not actuate said sensor when positioned in said housing interior.

3. The cooking apparatus as defined in claim 2, wherein said housing side wall ends in an upper rim and said first insert having an outwardly extending first flange supported by said upper rim when said first insert is positioned within said housing interior, said first insert having a first body portion extending below said first flange which engages said sensor and said first flange rests upon said rim.

4. The cooking apparatus as defined in claim 3, wherein said second insert has a second flange extending outwardly from a second body, said second flange being supported by said upper rim when said second insert is positioned within said housing interior, said second insert not engaging said sensor when positioned within said interior.

5. The cooking apparatus as defined in claim 1, wherein said sensor reduces the maximum heat output generatable by said heating device when said sensor is in an actuated position.

6. The cooking apparatus as defined in claim 5, wherein said first insert includes a stoneware pot which actuates said sensor upon insertion in said housing interior, and when said sensor is actuated said heating device is capable of only generating a heat output that is suitable for slow cooking.

7. The cooking apparatus as defined in claim 1, wherein said sensor is positioned on an inner surface of said housing base projecting upwardly into said housing interior, and wherein a bottom portion of said first insert actuates said sensor upon insertion of said first insert within said housing interior.

8. The cooking apparatus as defined in claim 1, wherein said heating device includes a plurality of heating elements and when said sensor is actuated one of said heating elements is rendered non-energizable thereby limiting the maximum heat output generated by said heating device.

9. The cooking apparatus as defined in claim 8, wherein said sensor includes an electrical switch operatively connected to said plurality of heating elements, and when said switch is actuated a circuit to one of said plurality of heating elements is opened and a circuit to said other of said plurality of heating elements is closed.

10. The cooking apparatus as defined in claim 1, wherein said sensor permits said heating device to selectively generate a heating profile to achieve a slow cooker function and a heating profile to achieve a roaster function.

11. A cooking apparatus comprising:
a housing having a base and an upwardly extending side wall forming a housing interior;
a heating device positioned within said housing interior including a first, second and third selectively controllable heating elements;
a cooking insert detecting sensor operatively connected to said first heating coil for controlling current flowing to said one of said first, second and third heating coils; and
a first cooking insert for holding food to be cooked and being positionable within said housing interior, said first insert actuating said insert detecting sensor upon insertion of said first insert into said housing interior.

12. The cooking apparatus as defined in claim 11, further including a second cooking insert for holding food to be cooked and being positionable within said housing interior, the second cooking insert being configured such that upon insertion thereof into said housing interior said insert detecting sensor remains in an unactuated position.

13. The cooking apparatus as defined in claim 12, further including a slow cooking function, and said first insert is a stoneware pot, said insert detecting sensor upon actuation by said stoneware pot restricts current flow to said one of said first, second and third heating elements in order to provide an appropriate heating profile for the slow cooking function and prevent cracking of said stoneware pot.

14. The cooking apparatus as defined in claim 13, further including a roaster function and said second insert is a metallic pan, said insert detecting sensor remains in said unactuated position when said metallic pan is inserted in said housing and permits current to flow to all of said plurality of heating elements in order to provide an appropriate heating profile for the roaster function.

15. The cooking device as defined in claim 11, further including a thermostat switch and a selector switch operatively connected to said insert detecting switch and heating device.

16. The cooking device as defined in claim 15, wherein said thermostat switch is normally closed such that current may flow there through to both said insert detecting switch and an input side of said selector switch, said selector switch having an output operatively connected to said second and third heating elements.

17. The cooking apparatus as defined in claim 15, wherein said selector switch has a first position which creates an open circuit to said second and third heating elements, said selector switch has a second position wherein current may be supplied only to one of said second and third heating elements, said selector switch has a third position wherein current may be supplied to both said second and third heating elements, said selector switch has a fourth position wherein current may be supplied only to said first heating element.

18. A cooking apparatus comprising:
a housing having a base and a wall extending upwardly therefrom forming a housing interior;
a heating device positioned in said housing interior;
a first and second cooking insert for holding food to be cooked, each of said first and second cooking inserts being separately positionable within said housing interior;
a sensor operatively connected to said heating device, said sensor being able to detect the presence of one of said first and second inserts when positioned within said housing, said sensor affecting the heat output of said heating device upon the detection of said one of said first and second inserts.

19. The cooking apparatus as defined in claim 18, wherein said sensor includes a switch being actuatable by said one of said first and second inserts.

20. The cooking apparatus as defined in claim 19, wherein said heating device includes a plurality of heating elements and said switch is operatively connected to one of said plurality of heating elements for interrupting power transmission thereto.

21. The cooking apparatus as defined in claim 18, wherein said first insert includes a stoneware pot and said second insert includes a metallic pan, and said sensor detecting the presence of said first insert within said housing and limiting a heat output of said heating device such that the cooking apparatus functions as a slow cooker.

22. The cooking apparatus as defined in claim 18, wherein said first insert has a configuration different than a configuration of said second insert, and wherein said difference in the configuration between said first and second inserts is detected by said sensor.

23. The cooking apparatus as defined in claim 22, wherein said housing side wall ends in an upper rim and said first insert has an outwardly extending first flange supported by said upper rim when said first insert is positioned within said housing interior, said first insert having a first body portion extending below said first flange which engages said sensor and said first flange rests upon said rim.

24. The cooking apparatus as defined in claim 23, wherein said second insert has a second flange extending outwardly from a second body, said second flange being supported by said upper rim when said second insert is positioned within said housing interior, said second insert not engaging said sensor when positioned within said interior.

25. The cooking apparatus as defined in claim 18, wherein said heating device includes a plurality of heating elements and said sensor includes a normally closed switch, said switch being actuated to an open position by said stoneware pot upon placement thereof in said housing, thereby decoupling one of said plurality of heating elements from a power source.

26. The cooking apparatus as defined in claim 18, wherein said heating device includes a plurality of heating elements, and said sensor includes a switch, upon actuation of said switch said first and second heating element having a heat output suitable for slow cooking are electrically coupled to a power source, and when said switch said first and second heating elements are electrically decoupled from the power source and a third heating element having a heat output suitable for roasting is electrically coupled to the power source.

27. The cooking apparatus as defined in claim 18, wherein said sensor upon actuation thereof limits the heat out put of said heating device.

* * * * *